United States Patent
Woo et al.

(10) Patent No.: US 11,628,901 B2
(45) Date of Patent: Apr. 18, 2023

(54) PERSONAL MOBILITY AND CONTROL METHOD THEREOF

(71) Applicants: Hyundai Motor Company, Seoul (KR); Kia Motors Corporation, Seoul (KR)

(72) Inventors: Seunghyun Woo, Seoul (KR); Minjae Park, Seongnam-si (KR); Jong Bok Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 420 days.

(21) Appl. No.: 17/074,925

(22) Filed: Oct. 20, 2020

(65) Prior Publication Data

US 2021/0403113 A1 Dec. 30, 2021

(30) Foreign Application Priority Data

Jun. 29, 2020 (KR) .................. 10-2020-0079506

(51) Int. Cl.
| | |
|---|---|
| *A01B 69/00* | (2006.01) |
| *B62J 27/00* | (2020.01) |
| *B62J 25/04* | (2020.01) |
| *B62J 45/40* | (2020.01) |
| *B62K 19/00* | (2006.01) |
| *B62K 11/00* | (2006.01) |

(52) U.S. Cl.
CPC ............... *B62J 27/00* (2013.01); *B62J 25/04* (2020.02); *B62J 45/40* (2020.02); *B62K 19/00* (2013.01); *B62K 11/00* (2013.01); *B62K 2202/00* (2013.01)

(58) Field of Classification Search
CPC . B62J 27/00; B62J 25/04; B62J 45/40; B62K 19/00; B62K 11/00; B62K 2202/00
See application file for complete search history.

(56) References Cited

U.S. PATENT DOCUMENTS

2014/0116735 A1* 5/2014 Bassett ................. A01C 7/203
                                                          172/430
2016/0128880 A1* 5/2016 Blickensderfer .... A61G 1/0256
                                                           296/20
2017/0185154 A1 6/2017 Chatterjee et al.

* cited by examiner

*Primary Examiner* — Adam M Alharbi
(74) *Attorney, Agent, or Firm* — Morgan, Lewis & Bockius LLP

(57) ABSTRACT

A personal mobility may include a sensor configured to detect an event; a plurality of protruding elements, each of which includes an actuator and a load sensor, protruding from the scaffold and configured of descending according to a load applied thereto or rising according to an output of the actuator; and a controller connected to the sensor and the plurality of protruding elements and configured to determine a position of the sole of the user based on an output of the protruding element descending according to the load of the user among the plurality of protruding elements when the user boards on the scaffold, determine the type of the event based on the output of the sensor and control to raise at least one protruding element among the protruding elements located below the sole based on the type of the event.

20 Claims, 8 Drawing Sheets

140: 140a, 140b, 140c
141: 141a, 141b, 141c
142: 142a, 142b, 142c

140: 140a, 140b, 140c
141: 141a, 141b, 141c
142: 142a, 142b, 142c

☐ : RAISED PROTRUDING ELEMENT (140)
250: 250a, 250b
400: 400a, 400b

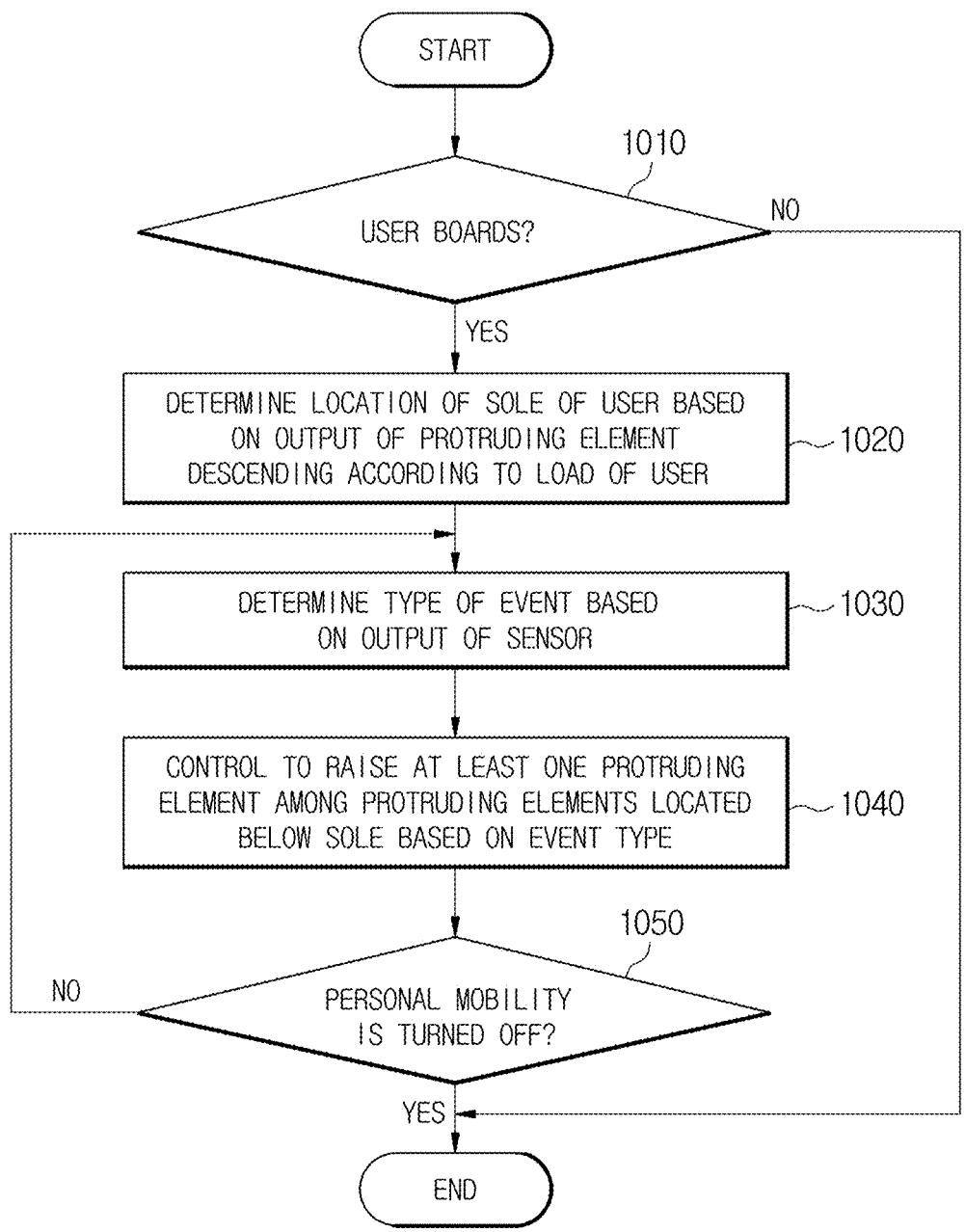

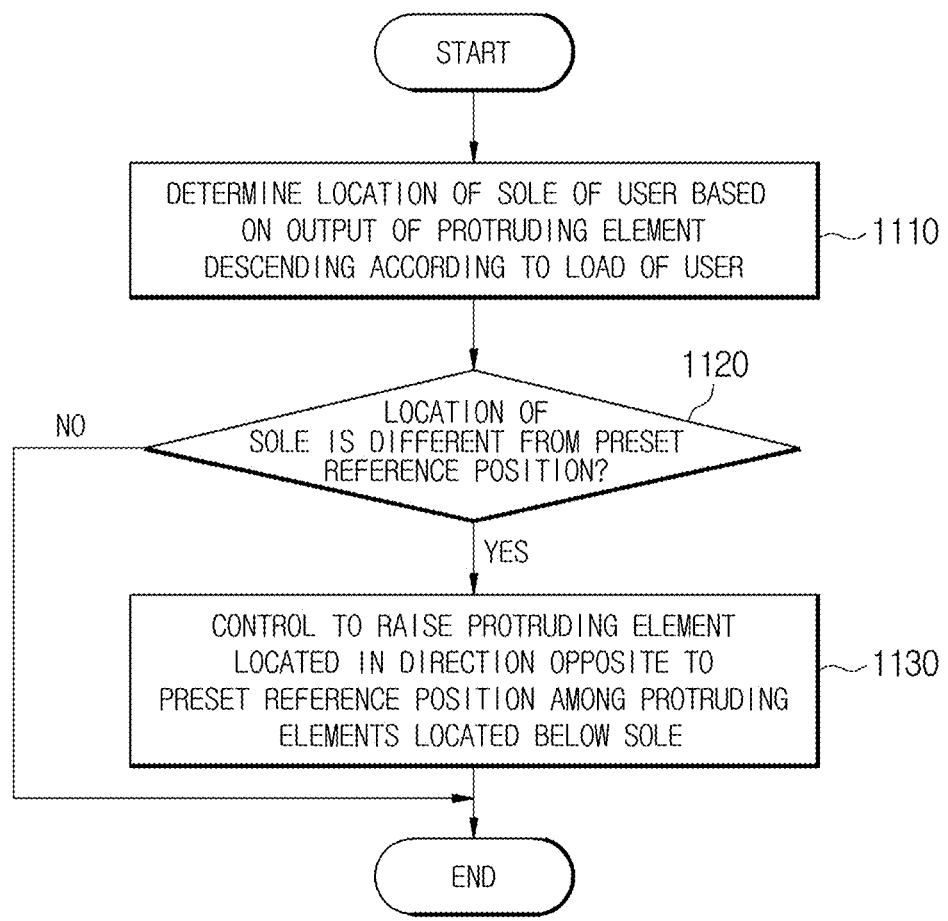

PERSONAL MOBILITY AND CONTROL METHOD THEREOF

CROSS-REFERENCE TO RELATED APPLICATION

The present application claims priority to Korean Patent Application No. 10-2020-0079506, filed on Jun. 29, 2020, the entire contents of which is incorporated herein for all purposes by this reference.

BACKGROUND OF THE INVENTION

Field of the Invention

The present invention relates to a personal mobility including a scaffold and a control method thereof.

Description of Related Art

Recently, as the market for personal mobility corresponding to a single-person mobility means powered by electricity has increased, the number of users using personal mobility has increased.

In general, the user of personal mobility is driving while standing still in the scaffold, and in many cases, the posture becomes unstable when rotating while standing or driving the slope way.

Furthermore, in the existing personal mobility, the device state and the like are displayed on the display provided on the main body, but in the case of personal mobility, when the user cannot look ahead, the risk due to distraction is much higher than in the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a personal mobility for determining the sole position of the user and deforming the surface around the determined position to promote the safety of the user, and to convey the event situation to the user without the user's forward gaze, and a control method thereof.

In accordance with one aspect of the present invention, a personal mobility including a scaffold, the personal mobility includes: a sensor configured to detect an event; a plurality of protruding elements, each of which includes an actuator and a load sensor, protruding from the scaffold and configured of descending according to a load applied thereto or rising according to an output of the actuator; and a controller connected to the sensor and the plurality of protruding elements and configured to determine a position of the sole of the user based on an output of the protruding element descending according to the load of the user among the plurality of protruding elements when the user boards on the scaffold, determine the type of the event based on the output of the sensor and control to raise at least one protruding element among the protruding elements located below the sole based on the type of the event.

The controller may be configured to control to raise a protruding element located below a heel of the user among the protruding elements located below the sole when determining the type of event as an event of driving uphill based on the output of the sensor.

The controller may be configured to control to raise a protruding element located below the front of the sole among the protruding elements located below the sole upon concluding the type of the event as an event of driving downhill based on the output of the sensor.

The controller may be configured to control to raise a protruding element located below a right sole of the user among the protruding elements located below the sole upon concluding the type of the event as a right-turning event based on the output of the sensor.

The controller may be configured to control to raise a protruding element located below a left sole of the user among the protruding elements located below the sole when determining the type of the event as a left-turning event based on the output of the sensor.

The controller may be configured to control to raise a protruding element located below the sole among the plurality of protruding elements when a device state notification is determined as an event based on the output of the sensor.

The controller may be configured to compare a position of the sole with a predetermined reference position and control to raise a protruding element located in a direction opposite to the predetermined reference position among the protruding elements located below the sole upon concluding that the position of the sole does not match the predetermined reference position.

The controller may be configured to determine a degree of rise of the plurality of protruding elements in proportion to a degree of the event.

The controller may be configured to determine the type of the event in real time and control the protruding element in real time based on the determined type of the event.

The controller may be configured to determine a higher priority event among the plurality of events based on preset priority information when a plurality of events occur in duplicate and control the protruding element based on the determined type of event.

The personal mobility further includes a cover provided on a top portion of the scaffold to cover the scaffold.

In accordance with one aspect of the present invention, a control method of a personal mobility including a sensor configured to detect a scaffold and an event, the control method includes: determining a position of the sole of the user based on an output of the protruding element descending according to the load of the user among a plurality of protruding elements, each of which includes an actuator and a load sensor, protruding from the scaffold and configured of descending according to the load or rising according to the output of the actuator when the user boards; determining the type of the event based on the output of the sensor; and controlling to raise at least one protruding element among the protruding elements located below the sole based on the type of the event.

The controlling to raise at least one protruding element among the protruding elements located below the sole may include: controlling to raise a protruding element located below a heel of the user among the protruding elements located below the sole when determining the type of event as an event of driving uphill based on the output of the sensor.

The controlling to raise at least one protruding element among the protruding elements located below the sole may include: controlling to raise a protruding element located below the front of the sole among the protruding elements located below the sole upon concluding the type of the event as an event of driving downhill based on the output of the sensor.

The controlling to raise at least one protruding element among the protruding elements located below the sole may include: controlling to raise a protruding element located below a right sole of the user among the protruding elements located below the sole upon concluding the type of the event as a right-turning event based on the output of the sensor.

The controlling to raise at least one protruding element among the protruding elements located below the sole may include: controlling to raise a protruding element located below a left sole of the user among the protruding elements located below the sole when determining the type of the event as a left-turning event based on the output of the sensor.

The controlling to raise at least one protruding element among the protruding elements located below the sole may include: controlling to raise a protruding element located below the sole among the plurality of protruding elements when a device state notification is determined as an event based on the output of the sensor.

The control method may further include: comparing the position of the sole with a predetermined reference position; and controlling to raise a protruding element located in a direction opposite to the predetermined reference position among the protruding elements located below the sole upon concluding that the position of the sole does not match the predetermined reference position.

The control method may further include: determining a degree of rise of the plurality of protruding elements in proportion to a degree of the event.

The control method may further include: determining the type of the event in a real time; and controlling the protruding element in real time based on the determined type of the event.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 is a flowchart illustrating a case in which a protruding element is controlled according to an event type among control methods of personal mobility according to various exemplary embodiments of the present invention.

FIG. 11 is a flowchart illustrating a case in which a protruding element is controlled by comparing a sole position and a reference position among control methods for personal mobility according to various exemplary embodiments of the present invention.

Figure 1:
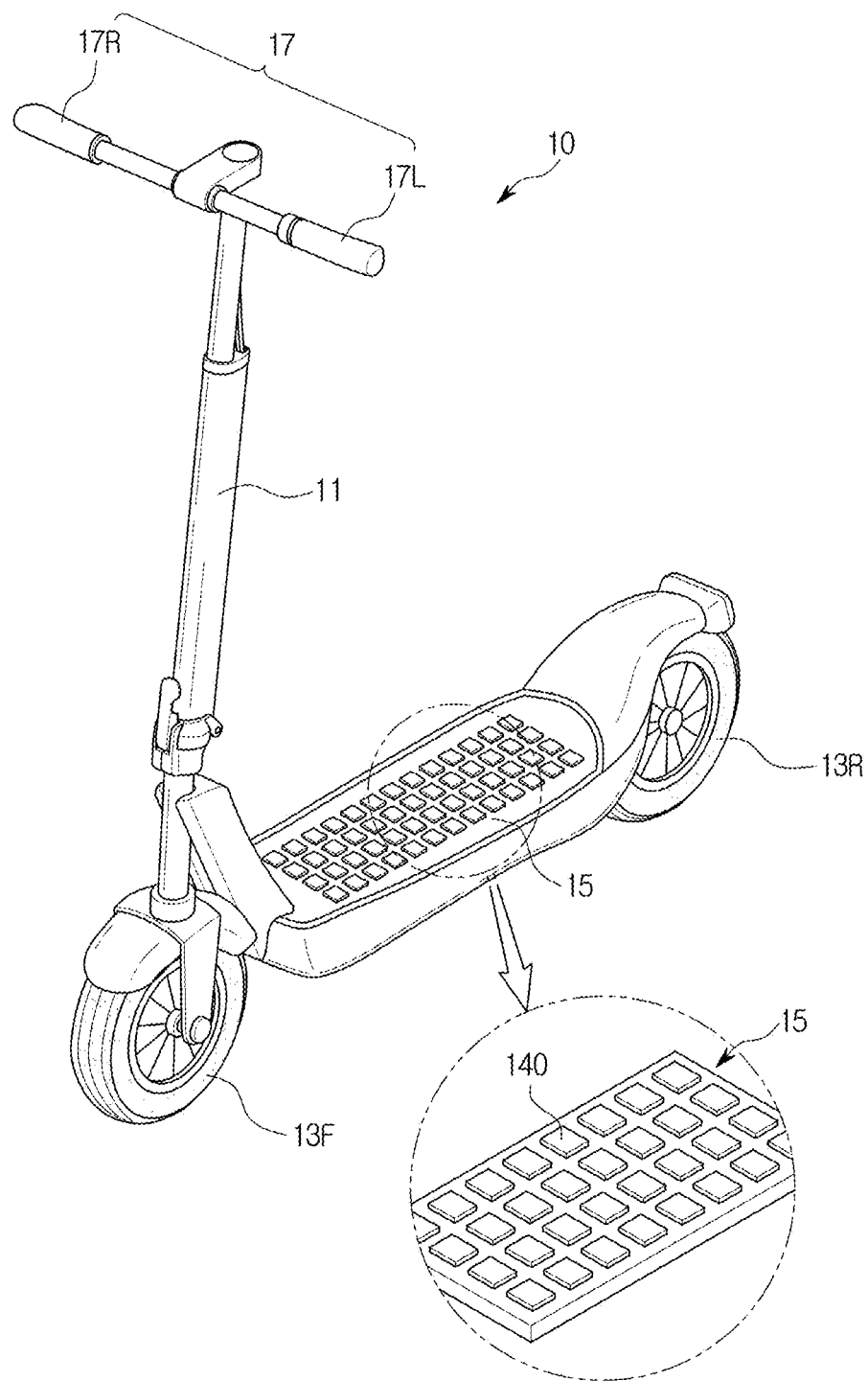
FIG. 1 is an external view of personal mobility according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of embodiments of the present invention will be described, and description of what are commonly known in the art or what overlap each other in the exemplary embodiments will be omitted.

It will be understood that when an element is referred to as being "connected" to another element, it may be directly or indirectly connected to the other element, wherein the indirect connection includes "connection" via a wireless communication network.

Furthermore, when a portion "includes" or "comprises" an element, unless there is a particular description contrary thereto, the portion may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, embodiments of a personal mobility and a control method thereof according to an aspect will be described in detail with reference to the accompanying drawings.

Figure 2A:
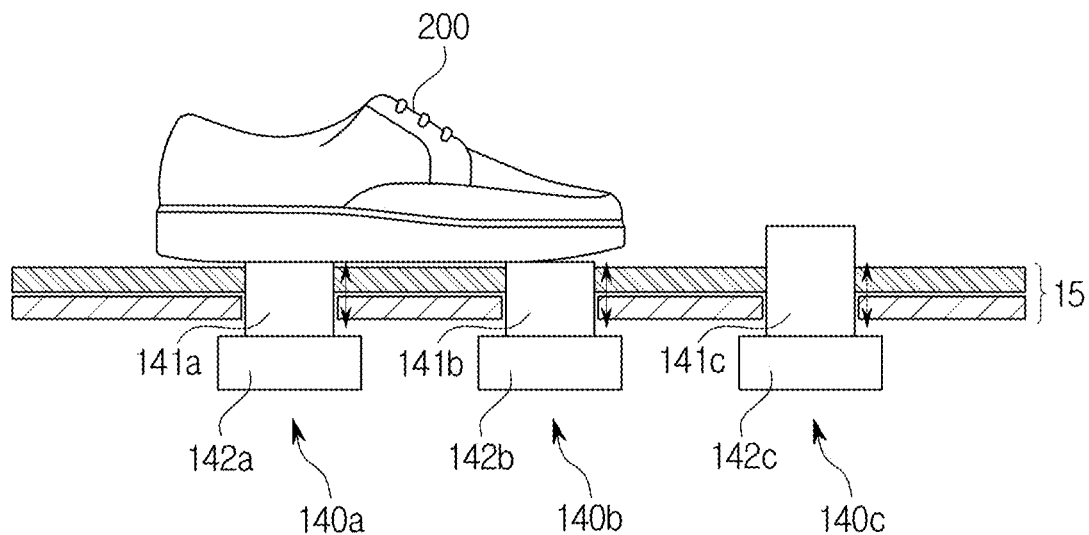
FIG. 2A is a side view of a protruding element according to various exemplary embodiments of the present invention.
Figure 2B:
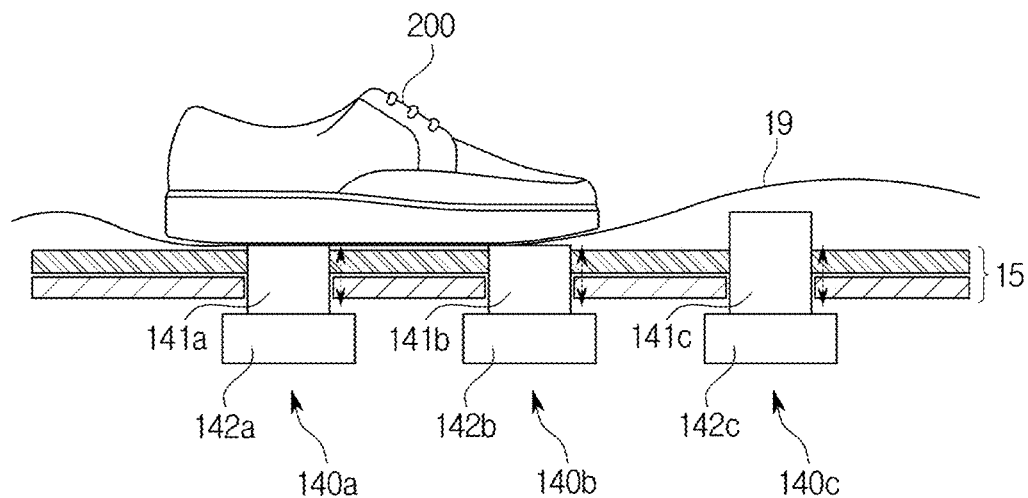
FIG. 2B is a side view of a personal mobility including cover according to various exemplary embodiments of the present invention.

FIG. 1 is an external view of personal mobility according to various exemplary embodiments of the present invention. FIG. 2A is a side view of a protruding element according to various exemplary embodiments of the present invention. FIG. 2B is a side view of a personal mobility including cover according to various exemplary embodiments of the present invention.

Personal mobility according to an exemplary embodiment means a small mobility means for one person or two persons configured for driving with electric power such as an electric kickboard, an electric bicycle, and an electric wheel. For a detailed description, in the exemplary embodiment described below, a case in which personal mobility is an electric kickboard including a scaffold will be referred to as an example. However, the exemplary embodiment described below is not limited in its type, as long as it is a personal mobility including a scaffold.

Referring to FIG. 1, the personal mobility 10 includes a steering bar 11, a handle 17 provided on the top portion of the steering bar 11 (left handle 17L and right handle 17R), a front wheel 13F provided at the bottom portion of the steering bar 11, a scaffold 15 extending from the bottom portion of the steering bar 11 to the rear of the front wheel 13F and a rear wheel 13R provided at the rear of the scaffold 15.

The user of the personal mobility 10 may stand on the scaffold 15 and drive while holding the left handle 17L and right handle 17R, and manipulate the left handle 17L and right handle 17R to adjust driving direction thereof.

At the present time, the scaffold 15 may be provided with a plurality of protruding elements 140. For example, as shown in FIG. 1, a plurality of protruding elements 140 may be disposed in each other and provided in the scaffold 15.

The scaffold 15 may include a plurality of holes, as shown in FIG. 2A, and a protruding element 140 may be provided in each of the plurality of holes. The protruding element 140 protrudes based on the top surface of the scaffold 15, and may descend according to a load or rise according to the power of the actuator.

The protruding element 140 includes a body 141 provided in a hole in the scaffold 15 and protruding based on an upper surface of the scaffold 15, which may descend or rise according to load or power, an actuator that transmits power to rise to the main body 141, and operation unit 142 including a load sensor for detecting the load applied to the body 141.

For example, among the plurality of protruding elements 140, the first protruding element 140a and the second protruding element 140b receive a load from the user's sole 200 and may descend as shown in FIG. 2A, and the body 141a of the first protruding element 140a and the body 141b of the second protruding element 140b may be positioned parallel to the top surface of the scaffold 15. At the instant time, the main body 141c of the third protruding element 140c may be positioned protruding relative to the top surface of the scaffold 15.

That is, among the plurality of protruding elements 140, the protruding element in which the user's sole is located may descend by a load and be positioned parallel to the top surface of the scaffold 15, and among the plurality of protruding elements 140, a protruding element in which the user's sole is not located may be positioned protruding relative to the top surface of the scaffold 15.

The personal mobility 10 according to various exemplary embodiments of the present invention may deform the surface of the scaffold 15 where the sole of the user is located when an event occurs by controlling the actuator to raise the protruding element where the user's sole is located among the plurality of protruding elements 140. This will be explained again in detail later.

As shown in FIG. 2B, the personal mobility 10 according to various exemplary embodiments of the present invention may include a cover 19 covering the scaffold 15. The cover 19 may be provided on the top portion of the scaffold 15 to protect the scaffold 15. For example, the cover 19 can prevent foreign matter from entering between the scaffold 15 and the protruding element 140.

Figure 3:
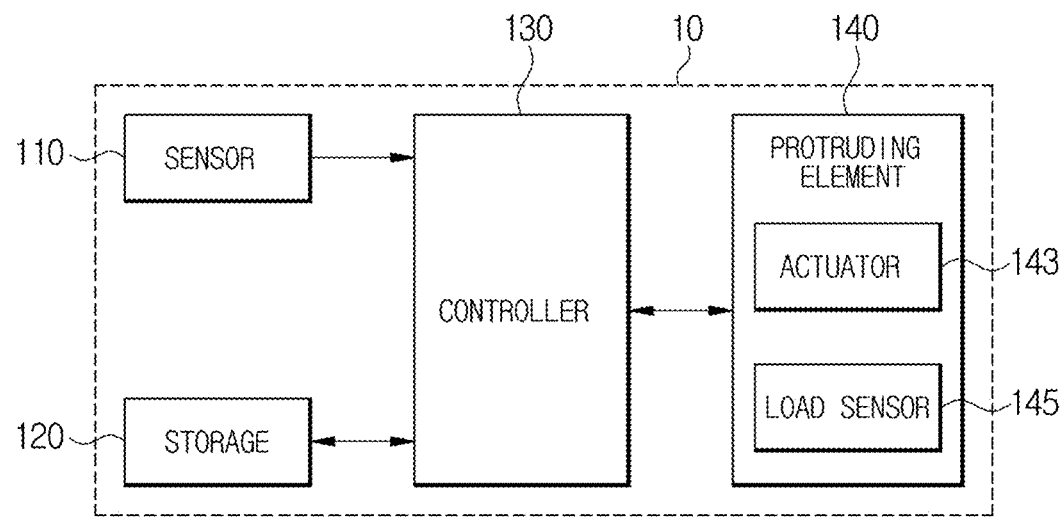
FIG. 3 is a control block diagram of personal mobility according to various exemplary embodiments of the present invention.

FIG. 3 is a control block diagram of personal mobility according to various exemplary embodiments of the present invention.

Referring to FIG. 3, personal mobility 10 according to various exemplary embodiments of the present invention may include a sensor 110 for detecting an event, a storage 120 for storing various information necessary for control, a controller 130 for controlling the rise of the protruding element 140 according to the type of event and a plurality of protruding elements 140 protruding from the scaffold 15 and descending according to the load or rising according to the output of the actuator.

The sensor 110 according to various exemplary embodiments of the present invention may detect an event.

For example, the sensor 110 may detect an event in which the personal mobility 10 runs in a slope way or an event in which the personal mobility 10 rotates, including a tilt sensor of a known type.

Furthermore, the sensor 110 includes at least one of a failure detection sensor (e.g., current sensor, voltage sensor, speed sensor, vibration sensor, etc.) that detects the failure of each portion of the personal mobility 10, a battery sensor (e.g., current sensor, voltage sensor) to check the battery level of personal mobility 10, a position sensor that detects the location of personal mobility (e.g., Global Positioning System (GPS) receiving module), a speed sensor for detecting the speed of the personal mobility 10, and may detect events that require device state notification (e.g., failure, low battery level, geo fence departure, high speed, etc.).

The storage 120 according to various exemplary embodiments of the present invention may store various information necessary for control, and for the present purpose, may be provided as a storage medium of a known type.

For example, storage 120 may store information related to the correlation between the type of event and the rising pattern of the protruding element 140, and may also store information related to the correlation between the output of the sensor 110 and the type of event.

The controller 130 according to various exemplary embodiments of the present invention may determine a position of the sole of the user based on the output of the protruding element 140 descending according to the load of the user among the plurality of protruding elements 140 when the user boards on the scaffold, determine the type of event based on the output of the sensor 110, and control to raise at least one protruding element 140 among the protruding elements 140 located below the sole based on the type of event.

For example, the controller 130 may control to raise the protruding element 140 located below a heel of the user among the protruding elements 140 located below the sole when determining the type of event as an event of driving uphill based on the output of the sensor 110.

Furthermore, the controller 130 may control to raise a protruding element 140 located below the front of the sole among the protruding elements 140 located below the sole when determining the type of the event as an event of driving downhill based on the output of the sensor 110.

Furthermore, the controller 130 may control to raise a protruding element 140 located below the right sole among the protruding elements 140 located below the sole when determining the type of the event as a right-turning event based on the output of the sensor 110.

Furthermore, the controller 130 may control to raise a protruding element 140 located below a left sole of the user among the protruding elements 140 located below the sole when determining the type of the event as a left-turning event based on the output of the sensor 110.

Furthermore, the controller 130 may control to raise a protruding element 140 located below the sole when a device state notification is determined as an event based on the output of the sensor 110.

Furthermore, the controller 130 may compare a position of the sole with a predetermined reference position and control to raise a protruding element 140 located in a direction opposite to the predetermined reference position among the protruding elements 140 located below the sole when the position of the sole does not match the predetermined reference position.

The controller 130 according to various exemplary embodiments of the present invention may determine a degree of rise of the protruding element 140 in proportion to a degree of the event.

For example, the controller 130 may determine a degree of rise of the protruding element 140 in proportion to the slope of the slope way when the personal mobility 10 is traveling on the slope way. Furthermore, the controller 130 may determine a degree of rise of the protruding element 140 in proportion to the rotation angle when the personal mobility 10 rotates and travels.

In the instant case, the controller 130 may control the actuator so that the protruding element 140 may rise to the determined degree of rise.

The controller 130 according to various exemplary embodiments of the present invention may determine the type of the event in real time and control the protruding element 140 in real time based on the determined type of the event.

That is, the controller 130 allows the rise and fall of the protruding element 140 to be continuously performed to prevent the shape deformation and heterogeneity of the sudden scaffold 15 by controlling the rise of the protruding element 140 in real time according to the type of event that changes in real time.

The controller 130 according to various exemplary embodiments of the present invention may determine a higher priority event among the plurality of events based on preset priority information when a plurality of events occur in duplicate and control the protruding element 140 based on the determined type of event.

For example, the controller 130 may control the protruding element 140 based on the type of event requiring device state notification based on preset priority information when the device state notification and the slope way driving event occur simultaneously.

The controller 130 may include at least one memory in which programs for performing the above-described operations and operations described below are stored, and at least one processor for executing the stored programs. In the case of a plurality of memory and processors, it is possible that they are integrated in one chip, and it is also possible to be provided in a physically separate location.

The protruding element 140 according to various exemplary embodiments of the present invention may be provided in a plurality of scaffolds 15 and may include a body 141 that rises or falls, an actuator 143 that transmits power to rise to the body 141 (e.g., a motor) and a load sensor 145 that detects a load applied to the main body 141.

The protruding element 140 may be raised by the power of the actuator 143 even in a state of being descended by a user's load under the control of the controller 130. In the present way, the scaffold 15 where the sole of the user is located is deformed by rising or falling of the protruding element 140, and the user may maintain a correct posture based on the shape-deformed scaffold 15 or recognize a notification.

In the above, each configuration of the personal mobility 10 has been described. Hereinafter, controlling the rise of the protruding element 140 according to the type of event will be described in detail.

Figure 4:
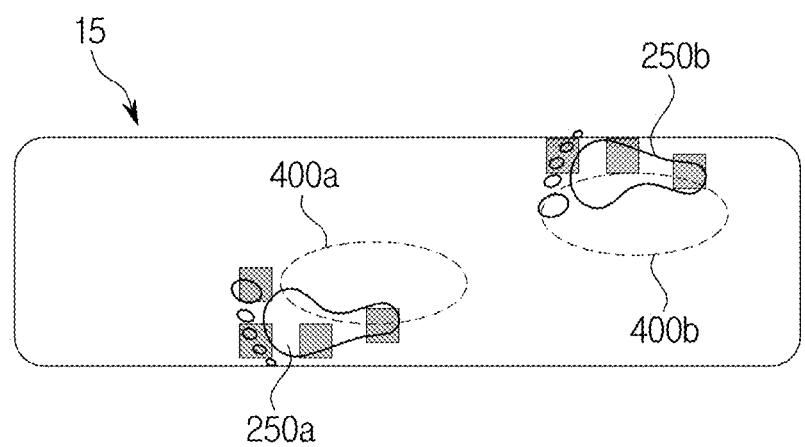
FIG. 4 is a diagram illustrating a case in which personal mobility according to an exemplary embodiment controls a protruding element when a user boards.

FIG. 4 is a diagram illustrating a case in which personal mobility according to an exemplary embodiment controls a protruding element when a user boards.

Referring to FIG. 4, the personal mobility 10 according to various exemplary embodiments of the present invention may determine a protruding element 140 descended by placing the sole 250 of the user based on the output from the load sensor 145 of the plurality of protruding elements 140 when the user boards and determine the location of the sole 250 of the user through this.

Personal mobility 10 according to various exemplary embodiments of the present invention, to induce the user's posture to the basic posture based on the position of user's sole 250, may control the corresponding actuator 143 such that at least one protruding element 140 among the protruding elements descended by placing the sole 250 of the user is raised.

The controller 130 may compare the position of the sole 250 with a predetermined reference position and control to raise a protruding element 140 located in a direction opposite to the predetermined reference position among the protruding elements 140 located below the sole 250 when the position of the sole 250 does not match the predetermined reference position. At the instant time, the predetermined reference position corresponds to a position in the scaffold 15 where the sole 250 of the user may be positioned in the basic posture.

For example, the controller 130 may compare the positions of soles 250a, 250b; 250 with predetermined reference positions 400a, 400b; 400, as shown in FIG. 4.

Accordingly, to induce the user to move the left sole 250a to the predetermined reference position 400a, the controller 130 may control to raise a protruding element 140 corresponding to the left end portion of the left sole 250a located in the opposite direction of the predetermined reference position 400a among the protruding elements 140 located below the left sole 250a and a protruding element 140 corresponding to the front side of the left sole 250a.

Furthermore, to induce the user to move the right sole 250b to the predetermined reference position 400b, the controller 130 may control to raise a protruding element 140 corresponding to the right end portion of the right sole 250b located in the opposite direction of the predetermined reference position 400b among the protruding elements 140 located below the right sole 250b.

When the user starts to board the personal mobility 10, the controller 130 may perform control of the protruding element 140 for inducing the user's posture to the basic posture based on the position of the sole 250 of the user. Furthermore, the controller 130 may perform control of the protruding element 140 for inducing the user's posture to the basic posture based on the position of the sole 250 of the user at a preset time interval when the user is driving the personal mobility 10. That is, while the personal mobility 10 is driving, an event for inducing a basic posture may occur at the preset time interval.

Figure 5:
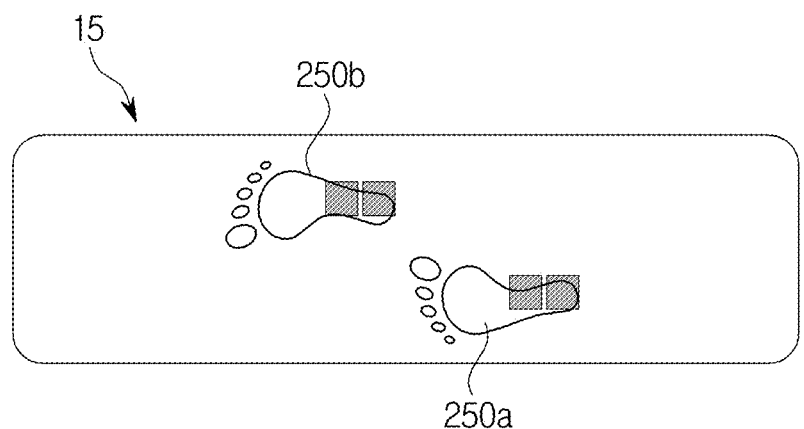
FIG. 5 is a diagram illustrating a case where a personal mobility controls a protruding element when an uphill driving event occurs according to various exemplary embodiments of the present invention.
Figure 6:
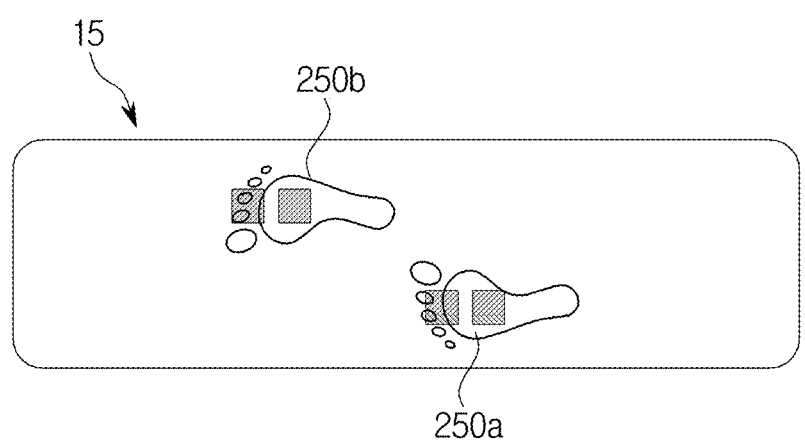
FIG. 6 is a diagram illustrating a case where a personal mobility controls a protruding element when a downhill driving event occurs according to various exemplary embodiments of the present invention.

FIG. 5 is a diagram illustrating a case where a personal mobility controls a protruding element when an uphill driving event occurs according to various exemplary embodiments of the present invention. FIG. 6 is a diagram illustrating a case where a personal mobility controls a protruding element when a downhill driving event occurs according to various exemplary embodiments of the present invention.

Referring to FIG. 5 and FIG. 6, a personal mobility 10 according to various exemplary embodiments of the present invention, when determining the type of event as an event driving the slope way based on the output of the sensor 110, may control to raise the protruding element 140 located below the slope among the protruding elements 140 located below the sole 250 to prevent the user from tilting.

For example, as shown in FIG. 5, the controller 130 may control to raise the protruding element 140 located below a heel of the user among the protruding elements 140 located below the sole 250 when determining the type of event as an event of driving uphill based on the output of the sensor 110.

Furthermore, as shown in FIG. 6, the controller 130 may control to raise a protruding element 140 located below the front of the sole 250 among the protruding elements 140 located below the sole 250 when determining the type of the event as an event of driving downhill based on the output of the sensor 110.

At the present time, the controller 130 may determine a degree of rise of the protruding element 140 in proportion to the slope of the slope way.

Through this, the personal mobility 10 may promote convenience and safety of the user by preventing the user from tilting even when driving on the slope way.

Figure 7:
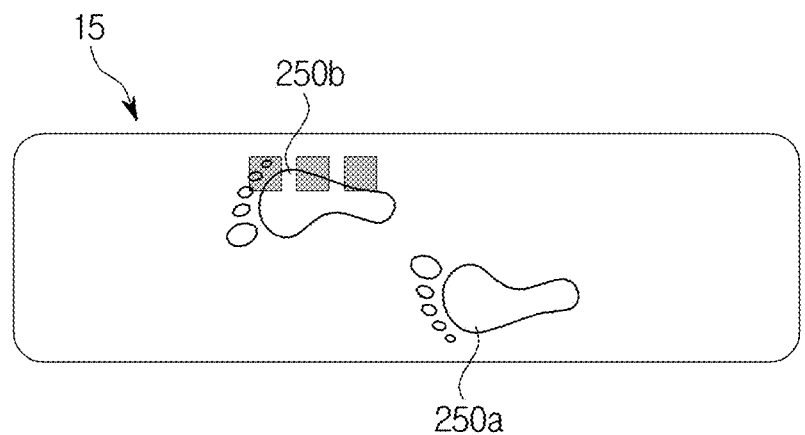
FIG. 7 is a diagram illustrating a case where a personal mobility controls a protruding element when a right turn driving event occurs according to various exemplary embodiments of the present invention.
Figure 8:
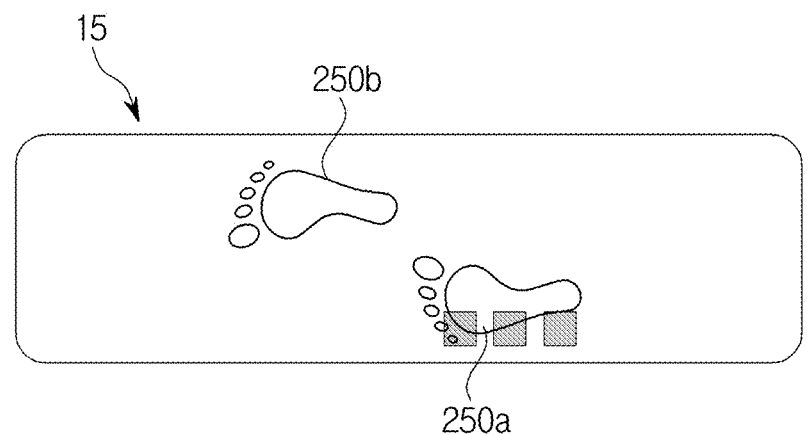
FIG. 8 is a diagram illustrating a case in which personal mobility controls a protruding element when a left turn driving event occurs according to various exemplary embodiments of the present invention.

FIG. 7 is a diagram illustrating a case where a personal mobility controls a protruding element when a right turn driving event occurs according to various exemplary embodiments of the present invention. FIG. 8 is a diagram illustrating a case in which personal mobility controls a protruding element when a left turn driving event occurs according to various exemplary embodiments of the present invention.

Referring to FIGS. 7 and 8, when determining the type of the event as an event rotating and traveling based on the output of the sensor 110, a personal mobility 10 according to various exemplary embodiments of the present invention may control to raise the protruding element 140 located below the sole 250 of the rotation direction among the protruding elements 140 located below the sole 250 to prevent the user from tilting.

For example, as shown in FIG. 7, the controller 130 may control to raise a protruding element 140 located below the right sole 250b among the protruding elements 140 located below the sole 250a, 250b; 250 when determining the type of the event as a right-turning event based on the output of the sensor 110.

Furthermore, as shown in FIG. 8, the controller 130 may control to raise a protruding element 140 located below the left sole 250a among the protruding elements 140 located below the sole 250a, 250b; 250 when determining the type of the event as a left-turning event based on the output of the sensor 110.

At the present time, the controller 130 may determine a degree of rise of the protruding element 140 in proportion to the rotation angle.

Through this, the personal mobility 10 may promote convenience and safety of the user by preventing the user from tilting even when driving in rotation.

Figure 9:
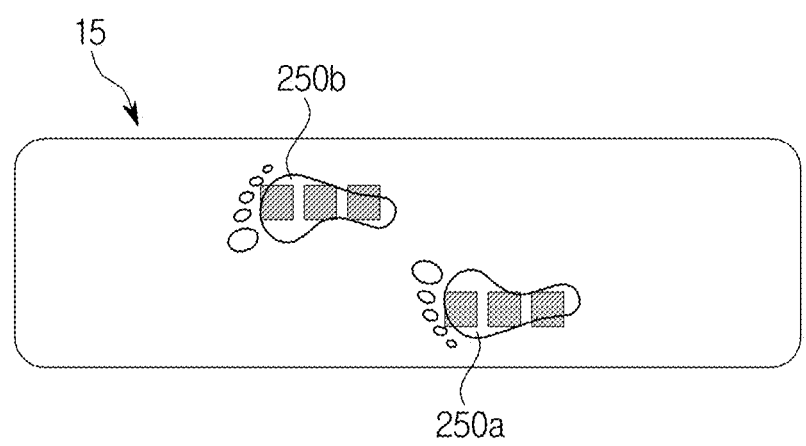
FIG. 9 is a diagram illustrating a case in which personal mobility controls a protruding element when a device state notification event occurs according to various exemplary embodiments of the present invention.

FIG. 9 is a diagram illustrating a case in which personal mobility controls a protruding element when a device state notification event occurs according to various exemplary embodiments of the present invention.

Referring to FIG. 9, the personal mobility 10 according to various exemplary embodiments of the present invention may control to raise the protruding element 140 located below the sole 250 when determining the type of event as an event that requires device state notification based on the output of the sensor 110.

For example, as shown in FIG. 9, the controller 130 may control to raise the protruding element 140 located below the sole 250 to transmit a device state notification to the user when determining the type of event as an event that requires device state notification.

However, to provide a shape deformation of different patterns according to the type of device state notification, the controller 130 may control to raise different protruding elements 140 among the protruding elements 140 located below the sole 250 according to the type of device state notification.

Hereinafter, a control method of a personal mobility 10 according to an exemplary embodiment will be described. The personal mobility 10 according to the above-described embodiment may be applied to the control method of the personal mobility 10 described later. Therefore, the contents described with reference to FIG. 1, FIG. 2, FIG. 3, FIG. 4, FIG. 5, FIG. 6, FIG. 7, FIG. 8 and FIG. 9 are equally applicable to the control method of the personal mobility 10 according to an exemplary embodiment even if there is no special mention.

FIG. 10 is a flowchart illustrating a case in which a protruding element is controlled according to an event type among control methods of personal mobility according to various exemplary embodiments of the present invention.

Referring to FIG. 10, personal mobility 10 according to various exemplary embodiments of the present invention, when the user boards (YES in 1010), may determine the location of the sole 250 of the user based on the output of the protruding element 140 descending according to the load of the user (1020).

That is, the personal mobility 10 may determine a protruding element 140 descended by placing the sole 250 of the user based on the output from the load sensor 145 of the plurality of protruding elements 140 when the user boards and determine the location of the sole 250 of the user through this.

The personal mobility 10 according to various exemplary embodiments of the present invention may determine the type of the event based on the output of the sensor 110 (1030), and may control to raise at least one protruding element 140 among the protruding elements 140 located below the sole 250 based on the event type (1040).

For example, a personal mobility 10, when determining the type of event as an event driving the slope way based on the output of the sensor 110, may control to raise the protruding element 140 located below the slope among the protruding elements 140 located below the sole 250 to prevent the user from tilting.

Furthermore, when determining the type of the event as an event rotating and traveling based on the output of the sensor 110, a personal mobility 10 may control to raise the protruding element 140 located below the sole 250 of the rotation direction among the protruding elements 140 located below the sole 250 to prevent the user from tilting.

Furthermore, the personal mobility 10 may control to raise the protruding element 140 located below the sole 250 when determining the type of event as an event that requires device state notification based on the output of the sensor 110.

Furthermore, when determining the type of event as an event for inducing basic posture, the personal mobility 10 may compare the position of the sole 250 with a predetermined reference position and control to raise a protruding element 140 located in a direction opposite to the predetermined reference position among the protruding elements 140 located below the sole 250 when the position of the sole 250 does not match the predetermined reference position.

The personal mobility 10 according to an exemplary embodiment determines the type of event based on the output of the sensor 110 when the power of the personal mobility is not turned off (No in 1050) (1030), and may repeat the operation 1040 of controlling to raise at least one protruding element 140 among the protruding elements 140 located below the sole 250 based on the event type.

In other words, the personal mobility 10 determines the type of event in real time, and may control the protruding element 140 in real time based on the determined type of event.

That is, the controller 130 allows the rise and fall of the protruding element 140 to be continuously performed to prevent the shape deformation and heterogeneity of the sudden scaffold 15 by controlling the rise of the protruding element 140 in real time according to the type of event that changes in real time.

FIG. 11 is a flowchart illustrating a case in which a protruding element is controlled by comparing a sole position and a reference position among control methods for personal mobility according to various exemplary embodiments of the present invention.

Referring to FIG. 11, the personal mobility 10 according to various exemplary embodiments of the present invention may determine the location of the sole 250 of the user based on the output of the protruding element 140 descending according to the load of the user (1110), when the location of the sole 250 is different from the predetermined reference position (YES in 1120), may control to raise the protruding element 140 located in the direction opposite to the predetermined reference position among the protruding elements 140 located below the sole 250 (1130).

Personal mobility 10, to induce the user's posture to the basic posture based on the position of user's sole 250, may control the corresponding actuator 143 such that at least one protruding element 140 among the protruding elements descended by placing the sole 250 of the user is raised.

The controller 130 may compare the position of the sole 250 with a predetermined reference position and control to raise a protruding element 140 located in a direction opposite to the predetermined reference position among the protruding elements 140 located below the sole 250 when the position of the sole 250 does not match the predetermined reference position. At the instant time, the predetermined reference position corresponds to a position in the scaffold 15 where the sole 250 of the user may be positioned in the basic posture.

When the user starts to board the personal mobility 10, the controller 130 may perform control of the protruding element 140 for inducing the user's posture to the basic posture based on the position of the sole 250 of the user. Furthermore, the controller 130 may perform control of the protruding element 140 for inducing the user's posture to the basic posture based on the position of the sole 250 of the user at a preset time interval when the user is driving the personal mobility 10. That is, while the personal mobility 10 is driving, an event for inducing a basic posture may occur at the preset time interval.

According to one aspect of personal mobility and control method thereof, it promotes the safety of the user, and the event situation may be transmitted to the user without the user's attention by determining the sole position of the user and deforming the surface around the determined position.

Meanwhile, the disclosed exemplary embodiments may be implemented in a form of a recording medium storing instructions that are executable by a computer. The instructions may be stored in a form of a program code, and when executed by a processor, the instructions may generate a program module to perform operations of the included exemplary embodiments. The recording medium may be implemented as a computer-readable recording medium.

The computer-readable recording medium may include all kinds of recording media storing commands which may be interpreted by a computer. For example, the computer-readable recording medium may be ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A personal mobility including a scaffold and comprising:
   a sensor configured to detect an event;
   a plurality of protruding elements, each of which includes an actuator and a load sensor, protruding from the scaffold and configured of descending according to a load applied thereto or rising according to an output of the actuator; and
   a controller connected to the sensor and the plurality of protruding elements and configured to determine a position of a sole of a user according to an output of a protruding element descending according to the load of the user among the plurality of protruding elements when the user boards on the scaffold, determine a type of the event according to an output of the load sensor and control to raise at least one protruding element among the plurality of protruding elements located below the sole according to the type of the event.

2. The personal mobility according to claim 1, wherein the controller is configured to control to raise a protruding element located below a heel of the user among the plurality of protruding elements located below the sole upon concluding the type of event as an event of driving uphill according to the output of the load sensor.

3. The personal mobility according to claim 1, wherein the controller is configured to control to raise a protruding element located below a front of the sole among the plurality of protruding elements located below the sole upon concluding the type of the event as an event of driving downhill according to the output of the load sensor.

4. The personal mobility according to claim 1, wherein the controller is configured to control to raise a protruding element located below a right sole of the user among the plurality of protruding elements located below the sole upon concluding the type of the event as a right-turning event according to the output of the load sensor.

5. The personal mobility according to claim 1, wherein the controller is configured to control to raise a protruding element located below a left sole of the user among the plurality of protruding elements located below the sole upon concluding the type of the event as a left-turning event according to the output of the load sensor.

6. The personal mobility according to claim 1, wherein the controller is configured to control to raise a protruding element located below the sole among the plurality of protruding elements when a device state notification is determined as the event according to the output of the load sensor.

7. The personal mobility according to claim 1, wherein the controller is configured to compare a position of the sole with a predetermined reference position and control to raise a protruding element located in a direction opposite to the predetermined reference position among the plurality of protruding elements located below the sole upon concluding that the position of the sole does not match the predetermined reference position.

8. The personal mobility according to claim 1, wherein the controller is configured to determine a degree of rise of the plurality of protruding elements in proportion to a degree of the event.

9. The personal mobility according to claim 1, wherein the controller is configured to determine the type of the event in a real time and control the plurality of protruding elements in the real time according to the determined type of the event.

10. The personal mobility according to claim 1, wherein the controller is configured to determine a higher priority event among a plurality of events according to preset priority information when a plurality of events occurs in duplicate and to control the plurality of protruding elements according to a type of the determined higher priority event.

11. The personal mobility according to claim 1, further including:
    a cover provided on a top portion of the scaffold to cover the scaffold.

12. A control method of a personal mobility including a sensor configured to detect an event, the control method comprises:
    determining a position of a sole of a user according to an output of a protruding element descending according to a load of the user among a plurality of protruding elements, each of which includes an actuator and a load sensor and protrudes from the scaffold and is configured of descending according to the load or rising according to an output of the actuator when the user boards on a scaffold of the personal mobility;
    determining a type of the event according to an output of the load sensor; and
    controlling to raise at least a protruding element among the plurality of protruding elements located below the sole according to the type of the event.

13. The control method according to claim 12, wherein the controlling to raise at least a protruding element among the plurality of protruding elements located below the sole includes:
    controlling to raise a protruding element located below a heel of the user among the plurality of protruding elements located below the sole upon concluding the type of event as an event of driving uphill according to the output of the load sensor.

14. The control method according to claim 12, wherein the controlling to raise at least a protruding element among the plurality of protruding elements located below the sole includes:
    controlling to raise a protruding element located below a front of the sole among the plurality of protruding elements located below the sole upon concluding the type of the event as an event of driving downhill according to the output of the load sensor.

15. The control method according to claim 12, wherein the controlling to raise at least a protruding element among the plurality of protruding elements located below the sole includes:
    controlling to raise a protruding element located below a right sole of the user among the plurality of protruding elements located below the sole upon concluding the type of the event as a right-turning event according to the output of the load sensor.

16. The control method according to claim 12, wherein the controlling to raise at least a protruding element among the plurality of protruding elements located below the sole includes:
    controlling to raise a protruding element located below a left sole of the user among the plurality of protruding elements located below the sole upon concluding the type of the event as a left-turning event according to the output of the load sensor.

17. The control method according to claim 12, wherein the controlling to raise at least a protruding element among the plurality of protruding elements located below the sole includes:
   controlling to raise a protruding element located below the sole among the plurality of protruding elements when a device state notification is determined as the event according to the output of the load sensor.

18. The control method according to claim 12, further including:
   comparing the position of the sole with a predetermined reference position; and
   controlling to raise a protruding element located in a direction opposite to the predetermined reference position among the plurality of protruding elements located below the sole upon concluding that the position of the sole does not match the predetermined reference position.

19. The control method according to claim 12, further including:
   determining a degree of rise of the plurality of protruding elements in proportion to a degree of the event.

20. The control method according to claim 12, further including:
   determining the type of the event in a real time; and
   controlling the plurality of protruding elements in the real time according to the determined type of the event.

* * * * *